(12) United States Patent
Kamiyama

(10) Patent No.: US 11,941,194 B2
(45) Date of Patent: Mar. 26, 2024

(54) ELECTRONIC PEN CARTRIDGE

(71) Applicant: Wacom Co., Ltd., Saitama (JP)

(72) Inventor: Ryoji Kamiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/150,703

(22) Filed: Jan. 5, 2023

(65) Prior Publication Data

US 2023/0161426 A1    May 25, 2023

Related U.S. Application Data

(63) Continuation of application No. PCT/JP2021/024131, filed on Jun. 25, 2021.

(30) Foreign Application Priority Data

Jul. 9, 2020   (JP) ................. 2020-118168

(51) Int. Cl.
| | |
|---|---|
| *G06F 3/0354* | (2013.01) |
| *G06F 3/038* | (2013.01) |
| *G06F 3/039* | (2013.01) |
| *G06F 3/044* | (2006.01) |
| *G06F 3/046* | (2006.01) |

(52) U.S. Cl.
CPC .......... *G06F 3/039* (2013.01); *G06F 3/03545* (2013.01); *G06F 3/0383* (2013.01); *G06F 3/0442* (2019.05); *G06F 3/046* (2013.01)

(58) Field of Classification Search
CPC .... G06F 3/03545; G06F 3/0383; G06F 3/039; G06F 3/0442; G06F 3/046
See application file for complete search history.

(56) References Cited

U.S. PATENT DOCUMENTS

2018/0364821 A1* 12/2018 Kaneda ................. G06F 3/0383

FOREIGN PATENT DOCUMENTS

| WO | 2016/031329 A1 | 3/2016 |
|---|---|---|
| WO | 2017/134920 A1 | 8/2017 |
| WO | 2017/149879 A1 | 9/2017 |
| WO | 2017/183526 A1 | 10/2017 |

OTHER PUBLICATIONS

International Search Report, dated Aug. 24, 2021, for International Application No. PCT/JP2021/024131, 5 pages.

* cited by examiner

*Primary Examiner* — Deeprose Subedi
(74) *Attorney, Agent, or Firm* — Seed IP Group LLP

(57) ABSTRACT

Provided is an electronic pen cartridge that is replaceable and constitutes an electronic pen by being attached to a cylindrical outer housing having a hollow portion inside, the electronic pen cartridge including an inner housing that is cylindrical, a circuit board housed in the inner housing, a pen pressure detector provided in the inner housing on a side of the inner housing adjacent to a pen tip, a core body that is rod-shaped and presses the pen pressure detector, and a coil provided at a position closer to the pen tip than the inner housing and having a first end and a second end connected to the circuit board, in which at least the coil is covered with a sealing portion made of resin.

5 Claims, 5 Drawing Sheets

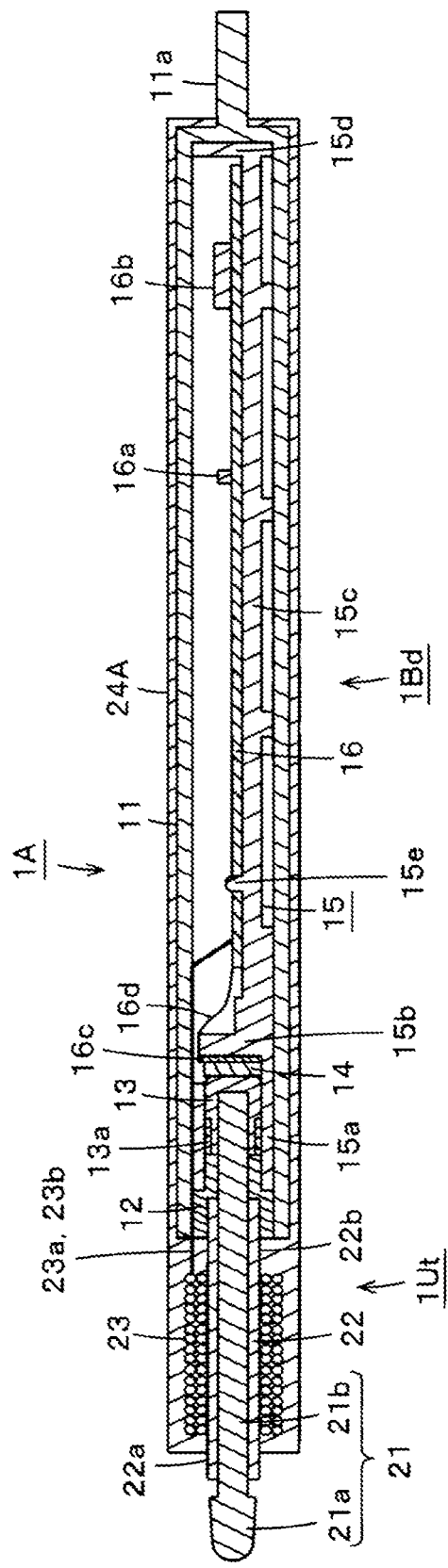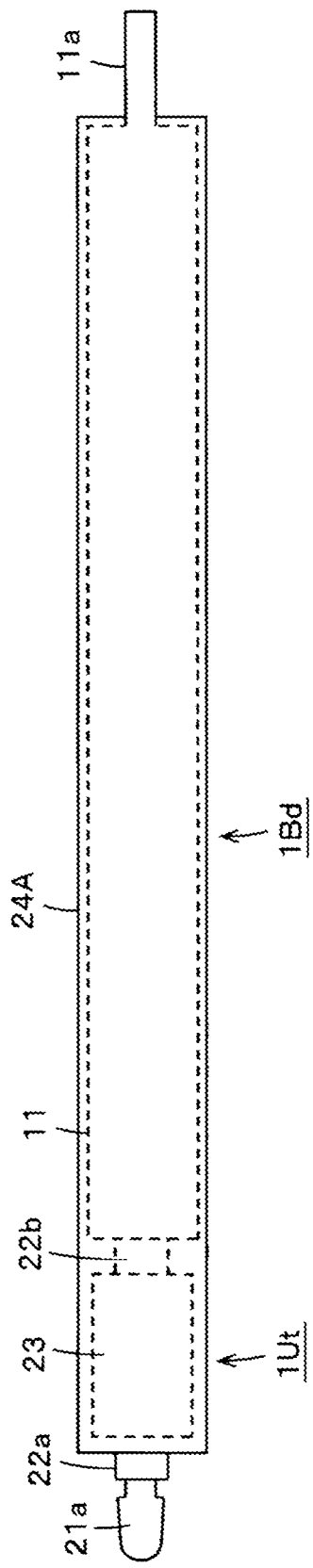

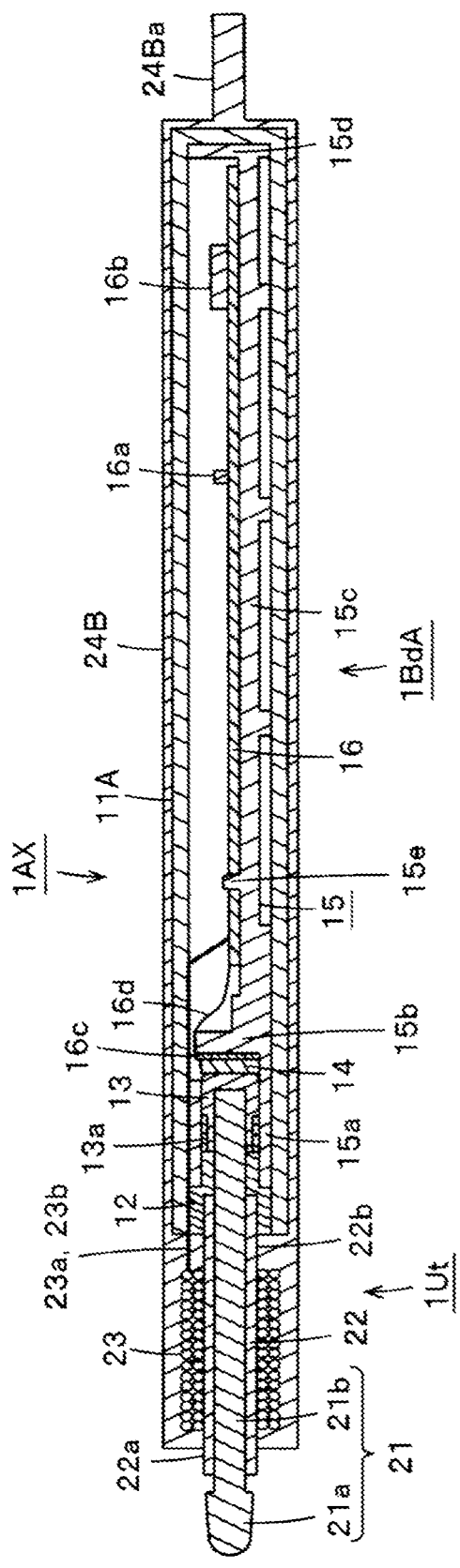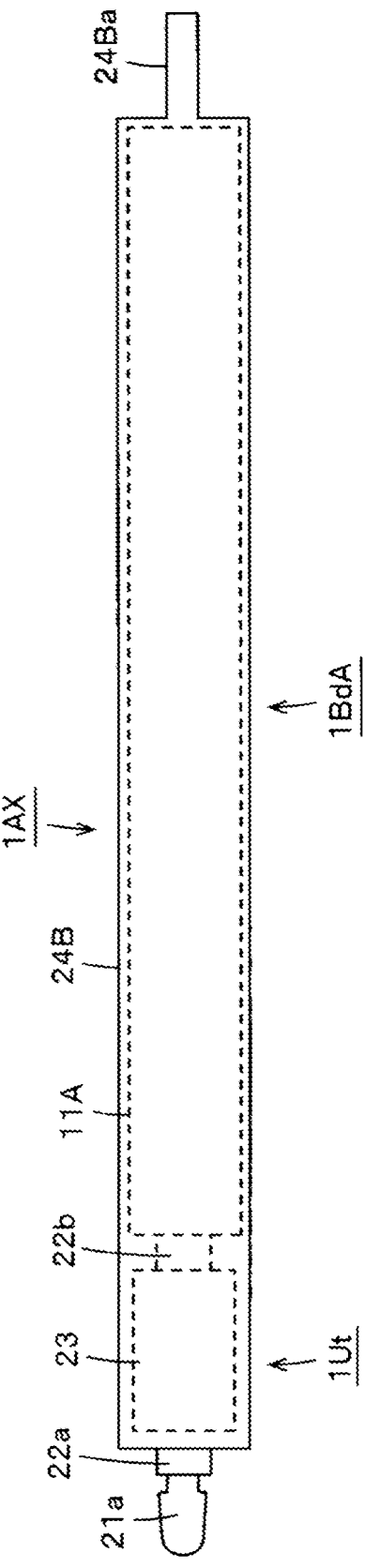

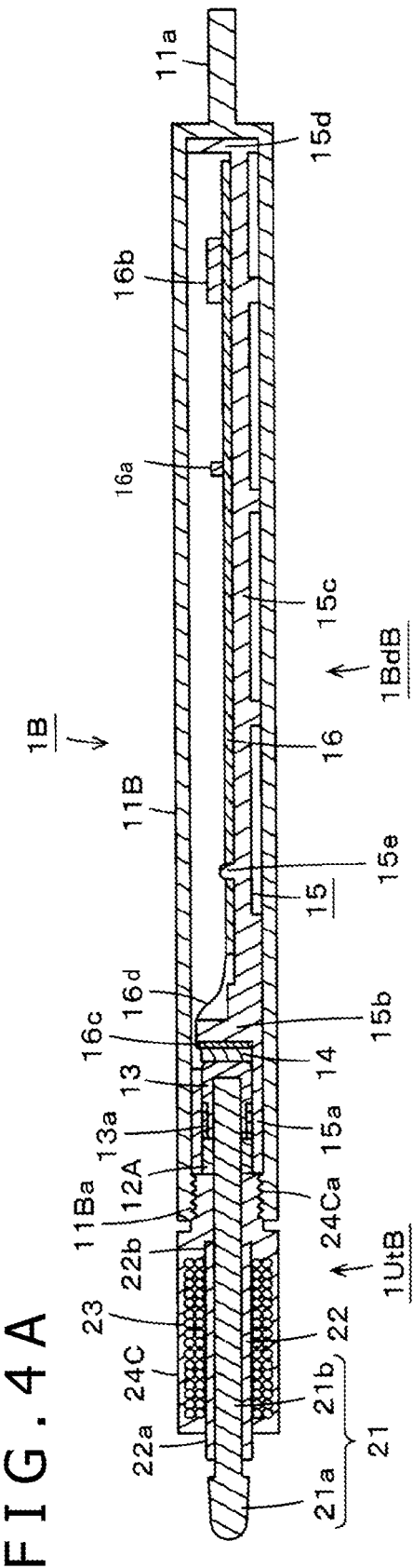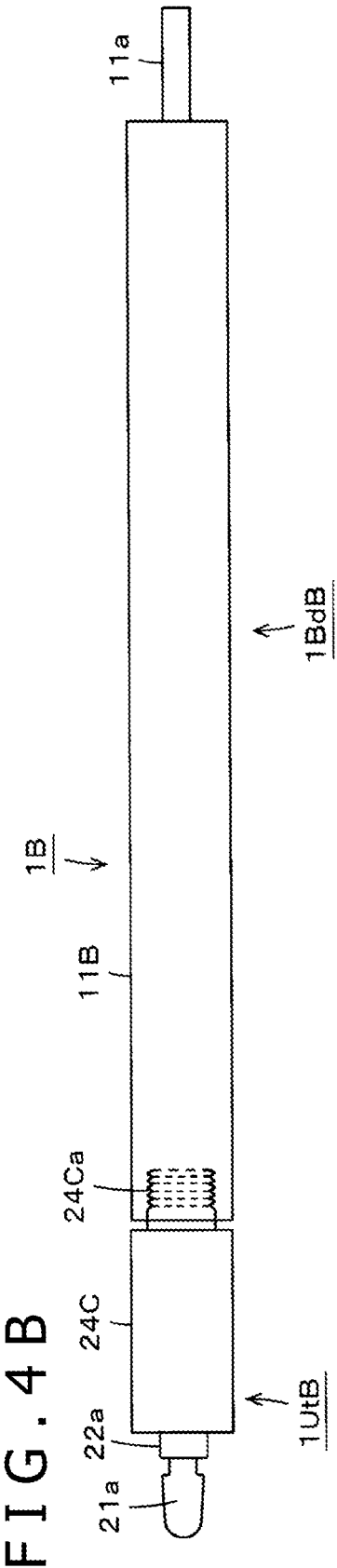

TO COIL 23

TO COIL 23

TO CIRCUIT BOARD 16

TO CIRCUIT BOARD 16

ELECTRONIC PEN CARTRIDGE

BACKGROUND

Technical Field

The present disclosure relates to an electronic pen cartridge for constituting an electronic pen that inputs information by indicating coordinates to various electronic devices equipped with a position detection sensor, for example, such as a tablet personal computer (PC).

Description of the Related Art

With the appearance of various electronic devices equipped with position detection sensors, electronic pens have also become widely used. However, there are demands for use of a refill equipped with an electronic pen function, which is placed in the housing of an accustomed writing tool such as a ballpoint pen, instead of using an electronic pen dedicated to an electronic device equipped with a position detection sensor. Therefore, an electronic pen used by placing a cartridge-type refill equipped with an electronic pen function (hereinafter referred to as an electronic pen cartridge) in the housing of an existing writing tool is considered.

Electronic devices equipped with position detection sensors are often carried to various places for use, and may be used in outdoor areas in wet weather or near water such as on coasts or rivers. For this reason, some electronic devices equipped with a position detection sensor are waterproof. In response to this, waterproof measures are being considered for electronic pens as well. For example, in PCT Patent Publication No. WO 2017/149879, which will be described later, disclosed is one in which constituent members and a circuit board for executing electronic pen functions are housed in a hollow portion of a cylindrical inner housing (cartridge case), and waterproof measures and the like are taken by filling the inside of the hollow portion of the inner housing with resin.

In the electronic pen disclosed in PCT Patent Publication No. WO 2017/149879, the core body can be mounted in the inner housing so that the pen tip protrudes from the inner housing. Further, the pen pressure detector is provided at the rear end of the inner housing, and the inner housing itself slides and moves to the rear side in the axial direction according to the pen pressure applied to the core body, and then can detect the writing pressure by being pressed by a protrusion of the housing lid provided at the rear end. In a case of the disclosure disclosed in PCT Patent Publication No. WO 2017/149879, since the constituent parts and the circuit board for fulfilling the electronic pen functions can be covered with resin, an electronic pen with sufficient waterproof measures can be achieved.

The electronic pen of the disclosure disclosed in PCT Patent Publication No. WO 2017/149879 described above has a configuration in which a pen pressure detector is provided at the rear end of the inner housing. Therefore, the inner housing moves while sliding in the outer housing to the rear side in the axial direction according to the writing pressure applied to the core body, so that the protrusion of the housing lid provided at the rear end of the outer housing presses the pen pressure detector of the inner housing. In this way, when the pen pressure detector is provided at the rear end of the inner housing, there is a concern that the pen pressure applied to the core body may be scattered on the way because the pen pressure detector is not directly pressed by the core body, and the responsiveness of pen pressure detection will be slightly reduced. If possible, the pen pressure detector is desirably placed on the pen tip side so that the pen pressure detector can be pressed directly by the core body.

Further, considering a case of an electromagnetic induction type electronic pen cartridge, for example, electronic components such as a pen pressure detector and a circuit board are housed in an inner housing, but a coil for forming a resonance circuit is often provided in a part in front of the inner housing. As described above, in a case where the coil is provided outside the inner housing, it is necessary to take waterproof measures for the coil portion. It is considered that, if the coil part gets wet, there are cases where the characteristics of the coil change, which may affect the resonance frequency of the resonance circuit including the coil, and affect detection of the indicated position and pen pressure on the position detection sensor side. In addition, it is desirable to manufacture electronic pen cartridges with as little labor as possible.

BRIEF SUMMARY

In view of the above, an object of the present disclosure is to provide an electronic pen cartridge for which waterproof measures are appropriately provided and whose manufacturing process is not complicated.

To solve the above-mentioned problem, provided is an electronic pen cartridge that is replaceable and constitutes an electronic pen by being attached to a cylindrical outer housing having a hollow portion inside, the electronic pen cartridge including an inner housing that is cylindrical, a circuit board housed in the inner housing, a pen pressure detector provided in the inner housing on a side of the inner housing adjacent to a pen tip, a core body that is rod-shaped and presses the pen pressure detector, and a coil provided at a position closer to the pen tip than the inner housing and having a first end and a second end connected to the circuit board, in which at least the coil is covered with a resin sealing portion.

According to this electronic pen cartridge, an electronic pen can be configured by mounting the cartridge on an outer housing, and a circuit board and a pen pressure detector are provided in an inner housing, and a core body is provided so as to press the pen pressure detector inside the inner housing. A coil is provided at a position closer to the pen tip than the inner housing, but at least the coil is covered with a resin sealing portion so that waterproof measures are taken and the electrical characteristics can be prevented from changing.

BRIEF DESCRIPTION OF THE SEVERAL VIEWS OF THE DRAWINGS

FIGS. 2A and 2B are diagrams for illustrating an electronic pen cartridge of a second embodiment of the present disclosure;

FIGS. 3A and 3B are diagrams for illustrating another example of the electronic pen cartridge of the second embodiment of the present disclosure;

FIGS. 4A, 4B and 4C are diagrams for illustrating an electronic pen cartridge of a third embodiment of the present disclosure;

DETAILED DESCRIPTION

Figure 1A:
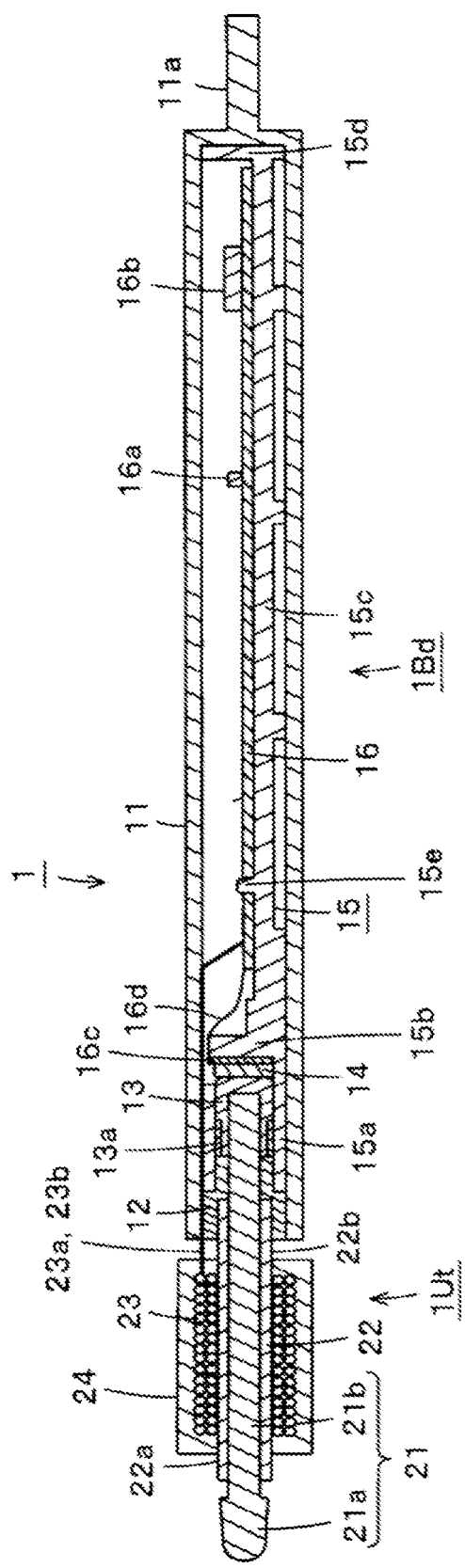
FIGS. 1A and 1B are diagrams for illustrating an electronic pen cartridge of a first embodiment of the present disclosure.

Hereinafter, embodiments of the electronic pen cartridge according to the present disclosure will be described with reference to the drawings. The position detection method of the electronic pen and the position detection sensor includes an electromagnetic induction method and a capacitance method, for example. In the electromagnetic induction method (electro magnetic resonance (EMR) method), the position detection device includes a sensor unit in which a plurality of loop coils are arranged in each of the X-axis direction and the Y-axis direction. A transmission period in which electric power is sequentially supplied to a plurality of loop coils of the sensor unit to generate a magnetic field and a reception period in which the supply of electric power is stopped and a magnetic field from the outside is received are alternately provided. The corresponding electronic pen is equipped with a resonance circuit having a coil and a capacitor, and generates a signal by a current flowing through the coil according to the magnetic field from the sensor unit, and then causes this signal to include the pen pressure information to send the signal to the position detection sensor. The position detection device receives the signal during the reception period, and detects the position indicated by the electronic pen and the pen pressure.

In the capacitance method, the position detection device includes a sensor unit in which a plurality of linear conductors (line electrodes) are arranged in each of the X-axis direction and the Y-axis direction. The sensor unit detects an indicated position according to a change in capacitance (charge) generated in the linear conductors when a finger or a capacitive pen is brought close to the sensor unit. The capacitive pen includes a pen-type position indicator having electric conductivity, or what is called an active capacitive pen (active electrostatic (AES) method) driven by a battery and transmitting signals. In a case of the active capacitive coupling method using an active capacitive pen, the electronic pen transmits signals from an oscillation circuit mounted on the electronic pen with the pen pressure information added to the signals, and the position detection device receives this and detects the indicated position and pen pressure.

The electronic pen cartridge of the present disclosure is suitable to be applied to an electromagnetic induction type electronic pen cartridge that includes a resonance circuit having a coil and a capacitor and may cause change of the characteristics of the resonance circuit when the coil gets wet. However, even in a case of an active capacitive coupling type electronic pen cartridge, the pen cartridge is similarly applicable when a coil for non-contact charging of the mounted battery is provided, for example. That is, the electronic pen cartridge of the present disclosure is applicable to one which is provided with a coil connected to a circuit board and for which appropriate waterproof measures need to be taken for the coil portion. In the embodiments described below, in order to simplify the explanation, a case of application to an electromagnetic induction type electronic pen cartridge will be described as an example.

The word "cartridge" means a component of a device that can be freely replaced. Hence, the electronic pen cartridge has an outer shape similar to that of a ballpoint pen refill, for example, and corresponds to a refill that fulfills an electronic pen function. Thus, by mounting the electronic pen cartridge of the present disclosure on an outer housing (a frame for housing a refill) such as a ballpoint pen, an electronic pen with an accustomed ballpoint pen housing can be achieved. Hereinafter, the electronic pen cartridge of the present disclosure will be specifically described.

First Embodiment

Figure 1B:
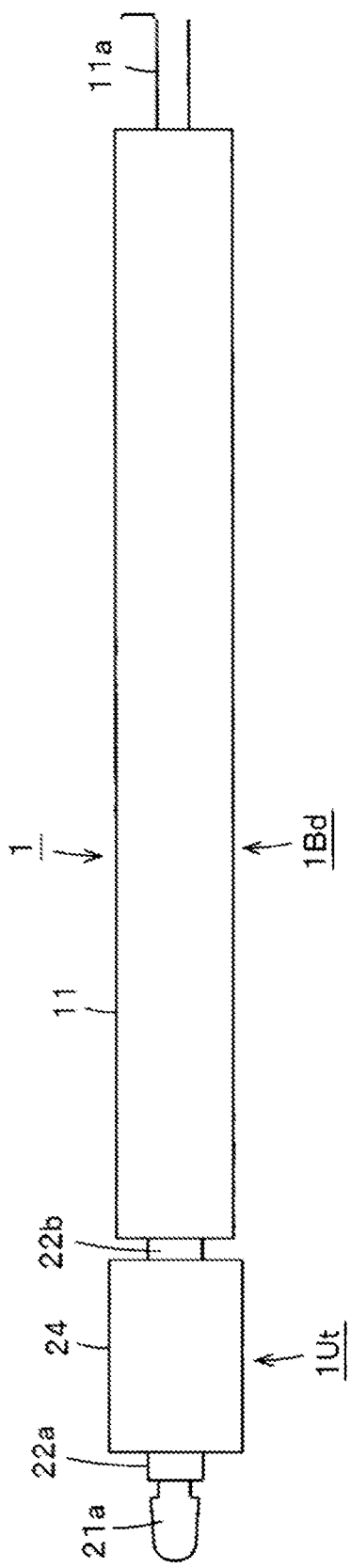

FIGS. 1A and 1B are diagrams for illustrating a configuration example of an electronic pen cartridge 1 according to a first embodiment. FIG. 1A is a cross-sectional view of the electronic pen cartridge 1 of the first embodiment cut in half in the longitudinal direction with the near side portion removed. Further, FIG. 1B is an external view of the electronic pen cartridge 1 illustrated in FIG. 1A. As illustrated in FIG. 1A, the electronic pen cartridge 1 is roughly composed of two parts, a main body portion 1Bd and a tip unit portion 1Ut.

The main body portion 1Bd is a portion configured by mounting various components in an inner housing 11. The inner housing 11 is a cylindrical body having a hollow portion inside. The inner housing 11 has an opening on the pen tip side (left end side in FIG. 1A), and the rear end side (right end side in FIG. 1A) is closed to form a bottom face, and a rod-shaped connector 11a extended in a rod shape toward the rear end side is further formed in the outer central portion of the bottom face. The rod-shaped connector 11a is provided for being internally attached to an outer housing such as a ballpoint pen that is held by the user.

A tip cap 12 is provided at the opening portion on the pen tip side of the inner housing 11, and a board holder 15 is provided behind the tip cap 12. The board holder 15 is an elongated component provided with a tip cylindrical portion 15a on the pen tip side, and behind this, an intermediate bottom face portion 15b having a thickness so as to form the bottom face of the tip cylindrical portion 15a, and further provided with a plate-shaped portion 15c extended from the rear end face of the intermediate bottom face portion 15b toward the rear end side. In addition, the board holder 15 includes a rear end bottom face portion 15d having a thick portion at the rear end of the plate-shaped portion 15c, and the rear end face of the rear end bottom face portion 15d is in contact with the inner bottom face of the inner housing. The intermediate bottom face portion 15b and the rear end bottom face portion 15d are portions formed in a circular flat plate shape having a diameter slightly shorter than the inner diameter of the inner housing 11.

The tip cap 12 is a cylindrical body having a shape in which two cylindrical portions having different diameters are connected to each other. The outer diameter of the cylindrical portion having a longer diameter of the tip cap 12 is the same as or slightly longer than the inner diameter of the inner housing 11, and the cylindrical portion having the longer diameter of the tip cap 12 is fitted into the tip opening of the inner housing 11 to be fixed. Further, the outer diameter of the cylindrical portion having a shorter diameter of the tip cap 12 is the same as or slightly longer than the inner diameter of the tip cylindrical portion 15a of the board holder 15, and the cylindrical portion having the shorter diameter of the tip cap 12 is fitted into the tip cylindrical portion 15a of the board holder 15 from the opening on the pen tip side. As a result, the board holder 15 is sandwiched between the tip cap 12 and the bottom face of the inner housing 11 and fixed in the hollow portion of the inner housing 11. Further, as will be described later, the rear end side of a ferrite core 22 is fitted from the pen tip side into the cylindrical portion having a longer diameter of the tip cap 12.

A cap-shaped pusher member 13 is provided behind the tip cap 12. As will be described later, a rear end of a core body 21 is attached to the pusher member 13, which functions to hold the core body 21 in the inner housing 11. The core body 21 is composed of a pen tip 21a formed such that its tip is rounded, and a shaft 21b extended in a rod shape from the pen tip 21a to the rear end side. A pen pressure detector 14 is provided behind the pusher member 13 so as to be sandwiched between the pusher member 13 and the intermediate bottom face portion 15b of the tip cylindrical portion 15a of the board holder 15.

The pen pressure detector 14 is configured as a micro electro mechanical systems (MEMS) sensor. The pen pressure detector 14 detects the pen pressure applied to the core body 21 as a change in capacitance, for example, by being pressed by the core body 21 and the pusher member 13. A coil spring 13a is provided around a part of the outer side surface (outer wall surface) of the pen pressure detector 14, and when the pen pressure applied to the core body 21 is released, the coil spring 13a pushes back the core body 21 to its original position by the restoration force.

In FIG. 1A, a circuit board 16 is placed and fixed on the upper surface of the board holder 15. Various circuit components such as a capacitor 16a and a control integrated circuit (IC) 16b are mounted on the circuit board 16 as main components to form a circuit unit. As illustrated in FIG. 1A, an electrode 16c connected to the pen pressure detector 14 is provided on the pen tip side of the circuit board 16, and the electrode 16c and the circuit unit formed on the circuit board 16 are electrically connected by a conductive portion 16d.

Further, the circuit board 16 is provided with a fixing hole passing through the circuit board 16 in the thickness direction at a predetermined position on the pen tip side. As illustrated in FIG. 1A, when the circuit board 16 is placed in a fixed position on the board holder 15, a fixing protrusion 15e provided on the board holder 15 is fitted in the fixing hole. Due to this, the position of the circuit board 16 on the board holder 15 is fixed. In this way, as illustrated in FIG. 1A, the tip cap 12, the pusher member 13, the pen pressure detector 14, the board holder 15, and the circuit board 16 are mounted in the inner housing 11 to configure the main body portion 1Bd.

On the other hand, the tip unit portion 1Ut is provided in front (pen tip side) of the main body portion 1Bd. The tip unit portion 1Ut includes the ferrite core 22 which has a cylindrical body having a through hole through which the core body 21 penetrates, and a coil 23 formed by winding a coated conductor wire around the side surface of the ferrite core 22. In the first embodiment, as illustrated in FIG. 1A, a first non-winding portion 22a and a second non-winding portion 22b in which coated conductor wires are not wound and no coil is formed are provided on both ends of the ferrite core 22, that is, certain definite ranges on the pen tip side and the rear end side.

Further, as illustrated in FIG. 1A, on the tip unit portion 1Ut, a sealing portion 24 is formed in such a manner as to cover the coil 23, a part of the first non-winding portion 22a on the coil 23 side, and a part of the second non-winding portion 22b on the coil 23 side. The sealing portion 24 gives a waterproof function to the coil 23 portion by covering the entire coil 23 with resin such as plastic, for example. To be specific, the coil 23 formed on the side surface of the ferrite core 22 is integrally wrapped by the sealing portion 24 formed of a resin material by what is called insert molding.

That is, insert molding is a molding method in which heat-melted resin such as plastic is injected into the space around a component inserted into a mold for the injection molding to integrate the inserted component and the injected resin. By integrating the components (a part of the ferrite core 22 and the coil 23) and the resin (sealing portion 24) in this way, the components can be shielded from the outside world by the resin and waterproof measures can be taken. The second non-winding portion 22b of the ferrite core 22 of the tip unit portion 1Ut thus formed is fitted into the cylindrical portion having the longer diameter of the tip cap 12 of the main body portion 1Bd for fixing.

The outer diameter of the ferrite core 22 is substantially the same as the inner diameter of the cylindrical portion having the longer diameter of the tip cap 12. Therefore, in the first embodiment, the second non-winding portion 22b of the ferrite core 22 and the cylindrical portion having the longer diameter of the tip cap 12 are bonded to each other by an adhesive such as a two-part epoxy adhesive. As illustrated in FIG. 1A, conductive wires 23a and 23b extended from both ends of the coil 23 are led out to the circuit board 16 along the inner side surface of the inner housing 11 and are connected to the circuit unit formed on the circuit board 16.

In this way, the tip unit portion 1Ut is attached to the main body portion 1Bd, and further, the rear end side of the shaft 21b of the core body 21 is inserted into and pushed in the tip opening of the ferrite core 22. As a result, as illustrated in FIG. 1A, the rear end of the shaft 21b of the core body 21 is attached to the pusher member 13 of the main body portion 1Bd to form the electronic pen cartridge 1. As illustrated in FIG. 1B, the appearance of the electronic pen cartridge 1 has a configuration in which the main body portion 1Bd and the tip unit portion 1Ut are connected, and the pen tip 21a of the core body 21 protrudes from the first non-winding portion 22a side of the ferrite core 22 of the tip unit portion 1Ut. The core body 21 is removable and can be replaced as needed.

In a case of the electronic pen cartridge 1 of the first embodiment, the entire coil 23 of the tip unit portion 1Ut is shielded from the outside world by the sealing portion 24, so that a waterproof function can be given. Consequently, when the electronic pen cartridge 1 is mounted in an outer housing such as a ballpoint pen housing, an electronic pen having a waterproof function can be achieved. The electronic pen cartridge 1 of the first embodiment has a diameter of 3.8 mm and a total length of 65.65 mm in the longitudinal direction, for example, and has almost the same size as a commercially available ballpoint pen refill.

In FIGS. 1A and 1B, in order to clarify the configuration including the main body portion 1Bd and the tip unit portion 1Ut, a gap is provided between the main body portion 1Bd and the sealing portion 24 when the main body portion 1Bd and the tip unit portion 1Ut are connected. However, the embodiment is not limited to this. By providing the sealing portion 24 up to the rear end side so as to cover the second non-winding portion 22b more, it is, needless to say, possible to have a configuration such that the rear end face of the sealing portion 24 and the front end face of the main body portion 1Bd are joined.

Second Embodiment

The electronic pen cartridge 1 of the first embodiment described above has a configuration in which the main body portion 1Bd and the tip unit portion 1Ut are bonded with an adhesive. For this reason, it is considered that the manufacturing efficiency may not be sufficiently improved because the bonding work process is typically required and the adhesive dry curing time is also required. Therefore, an electronic pen cartridge 1A of the second embodiment eliminates the bonding work process and eliminates the need for adhesive dry curing time.

FIGS. 2A and 2B are diagrams for illustrating a configuration example of the electronic pen cartridge 1A according to the second embodiment. FIG. 2A is a cross-sectional view of the electronic pen cartridge 1A of the second embodiment cut in half in the longitudinal direction with the near side portion removed. FIG. 2B is an external view of the electronic pen cartridge 1A illustrated in FIG. 2A. As can be seen by comparing FIG. 2A and FIG. 1A, in the electronic pen cartridge 1A of the second embodiment illustrated in FIGS. 2A and 2B, a component for fulfilling the electronic pen function has a configuration similar to that of the electronic pen cartridge 1 of the first embodiment described with reference to FIGS. 1A and 1B.

Hence, in the electronic pen cartridge 1A of the second embodiment illustrated in FIGS. 2A and 2B, the same reference sign is used for the portion configured similarly to the electronic pen cartridge 1 of the first embodiment described with reference to FIGS. 1A and 1B, and the detailed description of the part is omitted because of duplication. Also in a case of the electronic pen cartridge 1A of the second embodiment, the cartridge has the main body portion 1Bd and the tip unit portion 1Ut as in the case of the electronic pen cartridge 1 of the first embodiment described with reference to FIGS. 1A and 1B.

As illustrated in FIG. 2A, the main body portion 1Bd is a portion configured by mounting the tip cap 12, the pusher member 13, the pen pressure detector 14, the board holder 15, and the circuit board 16 in the inner housing 11. Further, the tip unit portion 1Ut is a portion arranged in front of the main body portion 1Bd, and is provided with the ferrite core 22 which is a cylindrical body having a through hole through which the core body 21 penetrates and the coil 23 formed by winding a coated conductor wire around the side surface of the ferrite core 22. Further, as illustrated in FIG. 2A, the first non-winding portion 22a and the second non-winding portion 22b in which coated conductor wires are not wound and no coil is formed are provided in certain definite ranges on the pen tip side and the rear end side of the ferrite core 22. This point is also similar to that of the electronic pen cartridge 1 of the first embodiment.

Further, also in a case of the electronic pen cartridge 1A of the second embodiment, the second non-winding portion 22b of the ferrite core 22 of the tip unit portion 1Ut is fitted into a cylindrical portion with the longer diameter of the tip cap 12 of the main body portion 1Bd to be fixed. However, in a case of the electronic pen cartridge 1A of the second embodiment, it is not necessary to bond the joints of both the portions with a two-part epoxy adhesive, for example. In a state where the main body portion 1Bd and the tip unit portion 1Ut are joined, a sealing portion 24A is formed by covering the periphery of these portions with a resin material such as plastic by insert molding.

That is, the sealing portion 24A includes a part of the first non-winding portion 22a of the ferrite core 22 and covers the entire portion including the rear end face of the inner housing 11. However, in the second embodiment, the sealing portion 24A does not cover the entire rod-shaped connector 11a provided in the outer central portion of the bottom face of the inner housing 11, and covers only the outer portion of the bottom face. In other words, except for the pen tip side portion of the first non-winding portion 22a of the ferrite core 22 and the rod-shaped connector 11a provided on the outside of the bottom face of the inner housing 11, the entire portion is covered with the sealing portion 24A.

As a result, as illustrated in FIG. 2B, the entire area including the connection between the main body portion 1Bd and the tip unit portion 1Ut can be covered with the sealing portion 24A, so that the electronic pen cartridge 1A in which the connection is not exposed can be achieved. In this case, the waterproof function can be firmly added to almost the entire electronic pen cartridge 1A including the coil 23. Moreover, since it is not necessary to bond the joint between the main body portion 1Bd and the tip unit portion 1Ut with an adhesive, the manufacturing efficiency can be improved.

Another Example of Second Embodiment

FIGS. 3A and 3B are diagrams for illustrating a configuration example of an electronic pen cartridge 1AX of another example of the second embodiment. FIG. 3A is a cross-sectional view of the electronic pen cartridge 1AX of another example of the second embodiment cut in half in the longitudinal direction with the near side portion removed. Further, FIG. 3B is an external view of the electronic pen cartridge 1AX illustrated in FIG. 3A. The electronic pen cartridge 1AX illustrated in FIGS. 3A and 3B has substantially the same configuration as the electronic pen cartridge 1A of the second embodiment described with reference to FIGS. 2A and 2B.

However, the configurations of an inner housing 11A and a sealing portion 24B are different from those of the inner housing 11 and the sealing portion 24A of the electronic pen cartridge 1A of FIGS. 2A and 2B. Therefore, in the electronic pen cartridge 1AX of another example illustrated in FIGS. 3A and 3B, the same reference signs are given to the portions configured similarly to the electronic pen cartridge 1A illustrated in FIGS. 2A and 2B, so that the description of the relevant portions is omitted, and the portions with different configurations will be described in detail.

In the electronic pen cartridge 1AX of another example of the second embodiment illustrated in FIG. 3A, the inner housing 11A of a main body portion 1BdA does not have the rod-shaped connector 11a formed on the outer surface of the bottom face of the rear end. The outer surface of the bottom face of the inner housing 11A is a flat surface. However, on the outside of the bottom face of the sealing portion 24B, a rod-shaped connector 24Ba is formed integrally with the sealing portion 24B. That is, in a case of the electronic pen cartridge 1AX of another example of the second embodiment illustrated in FIGS. 3A and 3B, the rod-shaped connector 24Ba extended in a rod shape on the rear end side is integrally formed at the central portion of the outer surface of the bottom face of the sealing portion 24B formed by insert molding.

As a result, the inner housing 11A can be made simple in shape so as not to include the rod-shaped connector 11a, and the rod-shaped connector 24Ba for use of attachment to the outer housing can also be formed as a part of the sealing portion 24B formed by insert molding. In this case, the appearance of the electronic pen cartridge 1AX illustrated in FIG. 3B can be made the same as the appearance of the electronic pen cartridge 1A illustrated in FIG. 2B. Consequently, the manufacturing process of the electronic pen cartridge can be simplified.

Third Embodiment

In the electronic pen cartridge 1 of the first embodiment described with reference to FIGS. 1A and 1B, since the main body portion 1Bd and the tip unit portion 1Ut are bonded with an adhesive, these portions are not able to be separated after bonding. Further, since the electronic pen cartridges 1A and 1AX of the second embodiment described with reference to FIGS. 2A to 3B are configured to be entirely covered with the sealing portions 24A and 24B, each of the main body portions 1Bd and 1BdA and the tip unit portion 1Ut are not able to be separated after the formation.

However, if the main body portion and the tip unit portion can be made up separately and connected closely so as to be attachable and detachable, the assembly is easy, and if there is a problem with either the main body portion or the tip unit portion, the defective one can be replaced. In addition, the components of the main body portion can also be replaced. Thus, an electronic pen cartridge 1B of the third embodiment described below is configured such that the main body portion and the tip unit portion are separately made up and can be closely attached so as to be attachable and detachable.

FIGS. 4A, 4B and 4C are diagrams for illustrating a configuration example of the electronic pen cartridge 1B according to the third embodiment. FIG. 4A is a cross-sectional view of the electronic pen cartridge 1B of the third embodiment cut in half in the longitudinal direction with the near side portion removed. Further, FIG. 4B is an external view of the electronic pen cartridge 1B illustrated in FIG. 4A. Further, FIG. 4C is an external view of only a tip unit portion 1UtB of the electronic pen cartridge 1B illustrated in FIG. 4B.

Even in a case of the electronic pen cartridge 1B of the third embodiment, the configuration of the portion that executes the electronic pen function is made in a similar manner to the electronic pen cartridge 1 of the first embodiment and the electronic pen cartridges 1A and 1AX of the second embodiment described above. Hence, also in the electronic pen cartridge 1B of the third embodiment illustrated in FIGS. 4A, 4B and 4C, the portion configured in a similar manner to the electronic pen cartridges 1, 1A and 1AX of the first and second embodiments described above is assigned with the same reference sign, and detailed description of the relevant portion will be omitted.

As illustrated in FIG. 4A, the electronic pen cartridge 1B of the third embodiment also includes a main body portion 1BdB and the tip unit portion 1UtB. The tip unit portion 1UtB is provided with the coil 23 by winding a coated conducting wire around a central portion of a side surface of the ferrite core 22 which is a cylindrical body having a through hole through which the core body 21 penetrates. Therefore, the first non-winding portion 22a in which a coil is not formed is set in a fixed range from one end (the end on the pen tip side) toward the other end (the end on the rear end side) of the ferrite core 22 in the longitudinal direction. Similarly, a fixed range from the other end (the end on the rear end side) toward the one end (the end on the pen tip side) is set as the second non-winding portion 22b in which the coil is not formed.

Further, a sealing portion 24C is provided so as to cover the coil 23, a part of the first non-winding portion 22a on the coil 23 side of the ferrite core 22, and the entire second non-winding portion 22b. Unlike the sealing portion 24 of the electronic pen cartridge 1 of the first embodiment, the sealing portion 24C is provided with a joint 24Ca behind the second non-winding portion 22b. The joint 24Ca is a protrusion which has a through hole through which the core body 21 passing through the through hole of the ferrite core 22 is allowed to penetrate, and projects toward the rear end side, and on which a thread for connecting to an inner housing 11B is formed.

That is, as illustrated in FIG. 4C, the tip unit portion 1UtB is configured so as to cover a part of the first non-winding portion 22a on the coil 23 side of the ferrite core 22, the coil 23, and the entire second non-winding portion 22b and have the joint 24Ca protruding toward the rear end side. As described above, the tip unit portion 1UtB is made by integrally forming the portion covering the coil 23 and the joint 24Ca having a thread by insert molding.

On the other hand, as illustrated in FIG. 4A, the inner housing 11B of the third embodiment has, in the opening on the pen tip side, a connecting portion 11Ba having a thread corresponding to a thread of the joint 24Ca formed on the sealing portion 24C of the tip unit portion 1UtB. A holding ring 12A is fitted into the opening of the tip cylindrical portion 15a of the board holder 15 so as to retain the pusher member 13 in the tip cylindrical portion 15a of the board holder 15. That is, the outer diameter of the holding ring 12A is the same as or slightly longer than the inner diameter of the tip cylindrical portion 15a.

Due to this, as illustrated in FIG. 4A, the joint 24Ca of the sealing portion 24C can be attached, by being rotated in a screw-in manner, to the connecting portion 11Ba formed by giving a thread in the opening of the inner housing 11B. Therefore, as illustrated in FIG. 4B, one electronic pen cartridge 1B can be configured in which the main body portion 1BdB and the tip unit portion 1UtB are closely connected to each other.

In this case, the coil 23 side of the first non-winding portion 22a of the ferrite core 22, the coil 23, and the entire second non-winding portion 22b are covered by the sealing portion 24C, so that these portions can be firmly provided with a waterproof function. Moreover, since the tip unit portion 1UtB and the inner housing 11B are connected by a screw, water or the like does not enter the inner housing 11B from the opening of tip of the inner housing 11B. Therefore, the waterproof function can be firmly added to the entire electronic pen cartridge 1B of the third embodiment.

As illustrated in FIG. 4C, the conductive wires 23a and 23b extended from both ends of the coil 23 are derived from the tip unit portion 1UtB. The conductive wires 23a and 23b are extended toward the inner housing 11B side, for example, through a groove provided in the longitudinal direction on a side surface of the inner housing 11B and is connected to the circuit unit formed on the circuit board 16 in the inner housing 11B. Actually, it is sufficient if the conductive wires from the circuit unit formed on the circuit board 16 in the inner housing 11B are led out to the groove provided on the side surface of the inner housing 11B in advance and the conductive wires 23a and 23b from the coil 23 of the tip unit portion 1UtB are connected thereto.

The connector between the conductive wires from the circuit unit formed on the circuit board 16 and the conductive wires 23a and 23b from the coil 23 can take various measures. For example, when a ring-shaped terminal for connection is provided at the tips of the conductive wires sent out in the groove on the side surface of the inner housing 11B and the conductive wires 23a and 23b from the coil 23 are hooked on this terminal, the connection can be easily made. Needless to say, other connection methods may be used. In conclusion, various connection methods for easy connection without any trouble can be adopted.

Modification Example of Third Embodiment

As described above, in a case of the electronic pen cartridge 1B of the third embodiment, the connection between the conduction wires extending from both ends of the coil 23 and the circuit unit of the circuit board 16 is made on the outer side surface of the inner housing. Thus, in addition to a process for connecting the coil 23 to the circuit unit, the part of the conductive wire, which is laid on the outer side surface, needs to be subjected to a waterproof process separately in a case of connection on the outer side surface of the inner housing 11B. Therefore, in the modification of the third embodiment, the coil 23 and the circuit unit of the circuit board 16 are connected to each other inside (within) the inner housing.

Figure 5:
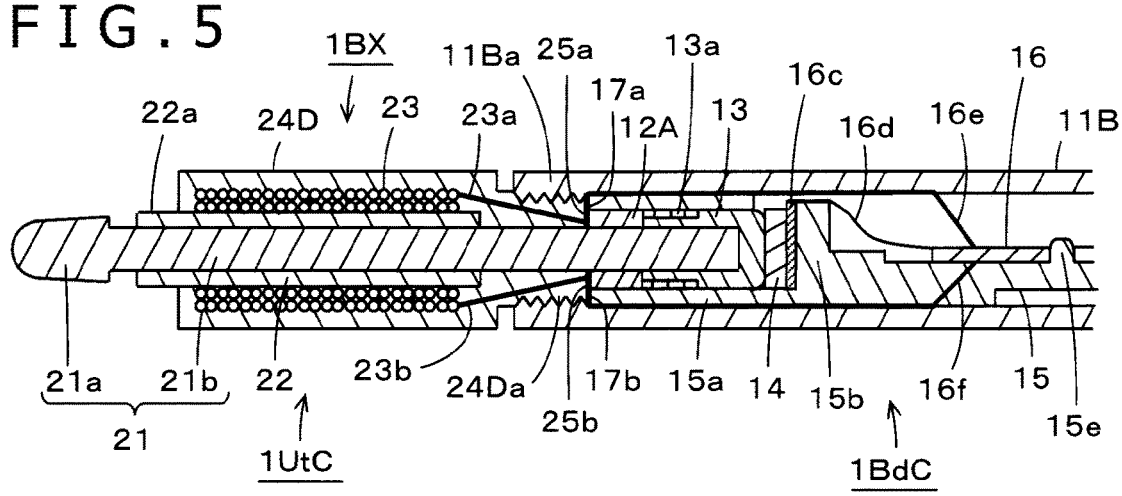
FIG. 5 is a diagram for illustrating another example of the electronic pen cartridge according to the third embodiment of the present disclosure.
Figure 6A:
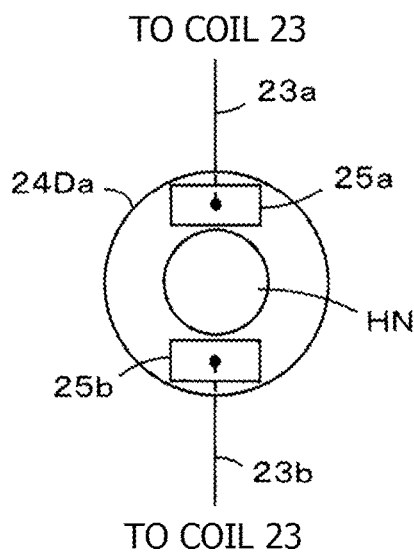
FIGS. 6A and 6B are diagrams for illustrating an electrical joint between the tip unit and the inner housing side of the electronic pen cartridge illustrated in FIG. 5.
Figure 6B:
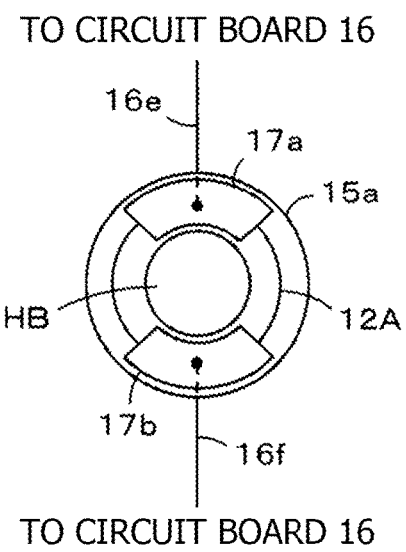

FIG. 5 is a cross-sectional view in a case where an electronic pen cartridge 1BX of another example of the third embodiment is cut in half in the longitudinal direction with the near side portion removed, and the connection between a main body portion 1BdC and a tip unit portion 1UtC is illustrated as an enlarged view. Further, FIGS. 6A and 6B are diagrams for illustrating the configurations of the rear end face of the joint 24Da of the tip unit portion 1UtC, and the tip faces of the tip cylindrical portion 15a and the holding ring 12A of the main body portion 1BdC.

The electronic pen cartridge 1BX of another example of the third embodiment illustrated in FIG. 5 is configured in substantially the same manner as the electronic pen cartridge 1B of the third embodiment described with reference to FIGS. 4A, 4B and 4C. Hence, in FIG. 5, the same reference signs are given to the portions configured in a similar manner to the electronic pen cartridge 1B of the third embodiment illustrated in FIGS. 4A, 4B and 4C, and detailed description of the portions will be omitted.

As illustrated in FIG. 5, in the tip unit portion 1UtC, the conductive wire 23a extending from one end of the coil 23 is connected to an electrode 25a provided on the rear end face of the joint 24Da. Similarly, the conductive wire 23b extended from the other end of the coil 23 is connected to an electrode 25b provided on the rear end face of the joint 24Da. That is, as illustrated in FIG. 6A, on the rear end face (end face exposed to the outside) of the joint 24Da formed by insert molding as a part of a sealing portion 24D, the electrodes 25a and 25b are provided at positions facing each other on both sides of a through hole HN through which the core body penetrates. As illustrated in FIG. 6A, the electrode 25a is connected to the conductive wire 23a extended from one end of the coil 23, and the electrode 25b is connected to the conductive wire 23b extended from the other end of the coil 23.

As described above, the joint 24Da is formed as a part of the sealing portion 24D, similarly to the joint 24Ca of the electronic pen cartridge 1B of the third embodiment illustrated in FIGS. 4A, 4B and 4C. However, the case of the joint 24Da is different from the tip unit portion 1UtB illustrated in FIGS. 4A, 4B and 4C in that the electrodes 25a and 25b are provided on the rear end face, and the conductive wires 23a and 23b from the coil are connected to the electrodes through the inside of the joint 24Da.

On the other hand, as illustrated in FIG. 5, conductive wires 16e and 16f extended from the circuit unit formed on the circuit board 16 mounted on the inner housing 11B are connected to electrodes 17a and 17b provided on the tip faces of the tip cylindrical portion 15a and the holding ring 12A of the main body portion 1BdC. To be specific, as illustrated in FIG. 6B, on the tip faces of the tip cylindrical portion 15a and the holding ring 12A, the electrodes 17a and 17b are provided at positions facing each other on both sides of a hole HB into which the core body is inserted. As illustrated in FIG. 6B, the conductive wire 16e extended from the circuit unit is connected to the electrode 17a, and the conductive wire 16f extended from the circuit unit is connected to the electrode 17b.

The rear end face of the joint 24Da illustrated in FIG. 6A and the tip faces of the tip cylindrical portion 15a and the holding ring 12A illustrated in FIG. 6B are surfaces facing each other when the tip unit portion 1UtC is attached to the connecting portion 11Ba of the main body portion 1BdC in a screw-in manner. It is assumed that the joint 24Da is fully inserted into the connecting portion 11Ba of the main body portion 1BdC by rotation. In this case, the electrode 25a on the rear end face of the joint 24Da and the electrode 17a on the tip faces of the tip cylindrical portion 15a and the holding ring 12A come in contact with each other while facing each other. Similarly, the electrode 25b on the rear end face of the joint 24Da and the electrode 17b on the tip faces of the tip cylindrical portion 15a and the holding ring 12A come in contact with each other while facing each other.

As a result, the coil 23 of the tip unit portion 1UtC and the circuit unit of the circuit board 16 mounted on the inner housing are electrically connected. As described above, in a case of the electronic pen cartridge 1BX of another example of the third embodiment, an electrical connection between the coil 23 and the circuit unit on the circuit board 16 can be made by simply attaching the joint 24Da to the connecting portion 11Ba of the main body portion 1BdC in a screw-in manner. Therefore, unlike the case of the electronic pen cartridge 1B of the third embodiment described with reference to FIGS. 4A, 4B and 4C, there is no need to connect the conductive wires extended from both ends of the coil 23 and the circuit unit of the circuit board 16 on the side surface of the inner housing. Consequently, the electronic pen cartridge 1BX for easy connection work can be configured.

Equivalent Circuit of Electronic Pen Cartridge

Figure 7:
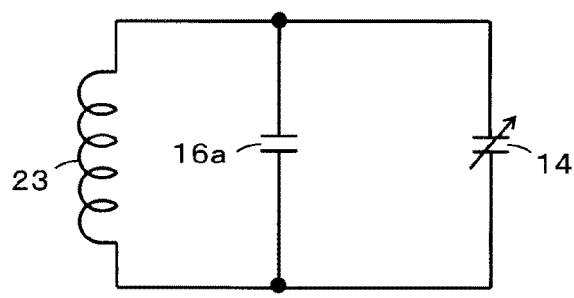
FIG. 7 is a diagram illustrating an equivalent circuit of the electronic pen cartridge according to the embodiments of the present disclosure.

FIG. 7 is a diagram illustrating an equivalent circuit of the electronic pen cartridges 1, 1A, 1AX, 1B, and 1BX according to the first, second, and third embodiments described above. As illustrated in FIG. 7, the electronic pen cartridges 1, 1A, 1AX, 1B, and 1BX have a configuration in which the coil (inductor) 23, the capacitor 16a, and the pen pressure detector 14 configured as a variable capacitance capacitor are connected in parallel.

Due to this, a resonance circuit is formed by the coil 23 and the capacitor 16a, and it becomes possible to receive a signal from a position detection sensor of the electromagnetic induction type to form a transmission signal, and to transmit the signal to the position detection sensor to indicate the position. Further, by providing the pen pressure detector 14 configured as a variable capacitance capacitor, information indicating the pen pressure can be included in the transmission signal transmitted from the electronic pen cartridges 1, 1A, 1AX, 1B, and 1BX, as a phase change of the transmission signal. As described above, each of the electronic pen cartridges 1, 1A, 1AX, 1B, and 1BX can execute the function as an electromagnetic induction type electronic pen.

Effects of Embodiments

In the case of the electronic pen cartridge 1 of the first embodiment described above, the coil 23 provided at a position closer to the pen tip side than the main body portion 1Bd can be covered thoroughly with the sealing portion 24 made of resin, so that waterproof functions can be added appropriately. Therefore, even if the electronic pen cartridge 1 is submerged in water, the resonance circuit including the coil 23 does not cause inconvenience such as change of the resonance frequency.

Further, in the case of the electronic pen cartridges 1A and 1AX of the second embodiment described above, the tip unit portion 1Ut including the coil 23 and the main body portion 1Bd or 1BdA can be entirely covered with the resin sealing portions 24A or 24B. As a result, a waterproof function can be added entirely to the tip unit portion 1Ut and the main body portion 1Bd or 1BdA.

Moreover, since the entire body is covered with the sealing portion 24A or 24B, it is not necessary to bond the main body portion 1Bd or 1BdA and the tip unit portion 1Ut with an adhesive, and it is not necessary to secure a curing time until the adhesive is cured. That is, the manufacturing process can be simplified, and the manufacturing time can be shortened. Further, in the case of the electronic pen cartridge 1AX of another example of the second embodiment, since the rod-shaped connector 24Ba for connecting to the outer housing can also be formed as a part of the sealing portion 24B, the manufacturing process can be further simplified.

Further, in a case of the electronic pen cartridges 1B and 1BX of the third embodiment described above, the main body portions 1BdB and 1BdC and the tip unit portions 1UtB and 1UtC can be connected in a screw-in manner, respectively. Due to this, the main body portion 1BdB or 1BdC and the tip unit portion 1UtB or 1UtC can be separately produced and easily connected in a screw-in manner, and thus the manufacturing process can be simplified. Moreover, since the main body portion 1BdB or 1BdC and the tip unit portion 1UtB or 1UtC can be separated at any time, a portion can be replaced if any of the portions is inconvenient.

Further, in the case of the electronic pen cartridge 1BX of another example of the third embodiment, when the main body portion 1BdC and the tip unit portion 1UtC are connected in a screw-in manner, the coil 23 and the circuit unit formed on the circuit board 16 can also be electrically connected. Consequently, further simplification of the manufacturing process can be realized.

MODIFICATION EXAMPLE

In the above-described embodiment, the size of the electronic pen cartridge 1 is described as having a diameter of 3.8 mm and a total length of 65.65 mm, but this is an example, and the size is not limited thereto. The size of the electronic pen cartridge can be adjusted in various ways.

Further, in the above-described embodiment, the case where the pen is applied to an electromagnetic coupling type electronic pen has been described as an example, but the present disclosure is not limited to this. As described above, the present disclosure can be also applied to a case where a waterproof function is added to the coil portion, for an electronic pen cartridge of an active capacitive type, for example, an electronic pen cartridge having a coil for charging a battery on the pen tip side.

Further, in another example of the third embodiment described with reference to FIGS. 5, 6A, and 6B, the electrodes 25a and 25b and the electrodes 17a and 17b can have various positions and shapes. That is, when the tip unit portion 1UtC and the main body portion 1BdC are connected, various modes can be used as long as the coil 23 and the circuit unit of the circuit board 16 can be electrically and reliably connected.

Further, it is sufficient if the inner housing is what is called a pipe-shaped one having a hollow portion, and its appearance may have various shapes such as a cylindrical shape and a polygonal columnar shape. Needless to say, it is sufficient if the shape of the outer housing to which the electronic pen cartridge of the present disclosure is mounted is what is called a pipe shape having a hollow portion into which the electronic pen cartridge can be mounted. Hence, the appearance of the outer housing may, needless to say, have various shapes such as a cylindrical shape and a polygonal columnar shape.

It is to be noted that embodiments of the present disclosure are not limited to the foregoing embodiments, and that various changes can be made without departing from the spirit of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen cartridge that is replaceable and constitutes an electronic pen by being attached to a cylindrical outer housing having a hollow portion inside, the electronic pen cartridge comprising:
   an inner housing that is cylindrical;
   a circuit board housed in the inner housing;
   a pen pressure detector provided in the inner housing on a side of the inner housing adjacent to a pen tip;
   a core body that is rod-shaped and presses the pen pressure detector;
   a coil provided at a position closer to the pen tip than the inner housing and having a first end and a second end connected to the circuit board;
   a first conductive wire extending from an end of the coil; and
   a second conductive wire extending from a circuit on the circuit board,
   wherein at least the coil is covered with a sealing portion made of resin,
   wherein the sealing portion includes a rod-shaped connector on a rear end face of the inner housing for connecting to an inside of the outer housing,
   wherein the coil is provided in an intermediate portion excluding a first non-winding portion and a second non-winding portion of a side surface of a ferrite core, the first non-winding portion of the ferrite core having a fixed range from a first end of a ferrite core toward a second end of a ferrite core in a longitudinal direction of the side surface of the ferrite core, the second non-winding portion of the ferrite core having a fixed range from the second end of the ferrite core toward the first end of the ferrite core, the ferrite core having a cylindrical body having a through hole through which the core body penetrates, and wherein the sealing portion constitutes a tip unit covering the coil, part of the first non-winding portion of the ferrite core on a side of the ferrite core adjacent to the coil, and an entirety of the second non-winding portion of the ferrite core, and having a joint behind the second non-winding portion of the ferrite core, the joint having a through hole through which the core body penetrating the through hole of the ferrite core penetrates, and a first thread for connection to the inner housing, wherein a connecting portion having a second thread corresponding to the first thread of the joint is formed in an opening of the inner housing on the side of the inner housing adjacent to the pen tip in the inner housing, and enables connection of the tip unit formed by the sealing portion covering the coil and the ferrite core, wherein the first conductive wire is connected to a first electrode provided on an end face of the joint, wherein the second conductive wire is connected to a second electrode provided on an end face of the connecting portion, and wherein, in operation, the first electrode provided on the end face of the joint and the second electrode provided on the end face of the connecting portion contact each other.

2. The electronic pen cartridge according to claim 1, wherein:

the coil is provided in an intermediate portion excluding a first non-winding portion and a second non-winding portion of a side surface of a ferrite core, the first non-winding portion having a fixed range from a first one end of the ferrite core toward a second end of the ferrite core in a longitudinal direction of the side surface of the ferrite core, the second non-winding portion having a fixed range from the second end of the ferrite core toward the first end of the ferrite core, the ferrite core having a cylindrical body having a through hole through which the core body penetrates, and the sealing portion covers at least the coil, part of the first non-winding portion of the ferrite core on a first side of the ferrite core adjacent to the coil, and part of the second non-winding portion of the ferrite core on a second side of the ferrite core adjacent to the coil.

3. The electronic pen cartridge according to claim 1, wherein the sealing portion integrally covers the inner housing together with the coil.

4. The electronic pen cartridge according to claim 3, further comprising:

a rod-shaped connector for connecting the electronic pen cartridge to an inside of the outer housing on a rear end face of the inner housing, wherein the sealing portion does not cover an entirety of the rod-shaped connector.

5. The electronic pen cartridge according to claim 1, wherein:

the coil constitutes a resonance circuit by being connected in parallel to a capacitor mounted on the circuit board and the pen pressure detector.

\* \* \* \* \*